United States Patent
Black et al.

(10) Patent No.: US 6,738,608 B2
(45) Date of Patent: May 18, 2004

(54) FREQUENCY-TIMING CONTROL LOOP FOR WIRELESS COMMUNICATION SYSTEMS

(75) Inventors: Peter J. Black, San Diego, CA (US); Nagabhushana T. Sindhushayana, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 234 days.

(21) Appl. No.: 10/075,578

(22) Filed: Feb. 12, 2002

(65) Prior Publication Data

US 2003/0186666 A1 Oct. 2, 2003

(51) Int. Cl.[7] .................................................. H04B 1/06
(52) U.S. Cl. ....................... 455/260; 155/258; 155/255; 375/316; 375/327
(58) Field of Search ................................ 455/260, 258, 455/255, 70, 71, 256, 230, 290.1, 161.1; 375/306, 219, 316, 324, 327, 335, 376

(56) References Cited

U.S. PATENT DOCUMENTS

| | | | | |
|---|---|---|---|---|
| 5,642,243 A | * | 6/1997 | Bliss | 360/51 |
| 5,778,032 A | * | 7/1998 | Tanaka et al. | 375/355 |
| 5,909,148 A | * | 6/1999 | Tanaka | 331/2 |
| 5,910,945 A | * | 6/1999 | Garrison et al. | 370/324 |
| 5,991,349 A | * | 11/1999 | Chen | 375/355 |
| 6,304,619 B1 | * | 10/2001 | Citta et al. | 375/343 |
| 6,560,298 B1 | * | 5/2003 | Froehling et al. | 375/344 |
| 6,563,862 B1 | * | 5/2003 | Knutson et al. | 375/219 |
| 2001/0017902 A1 | | 8/2001 | Yamagata et al. | |
| 2002/0150190 A1 | * | 10/2002 | Parr et al. | 375/354 |
| 2003/0058952 A1 | * | 3/2003 | Webster et al. | 375/260 |
| 2003/0147426 A1 | * | 8/2003 | Cronin et al. | 370/503 |

FOREIGN PATENT DOCUMENTS

| EP | 818904 A2 | * | 1/1998 | ........... H04L/27/26 |
|---|---|---|---|---|
| EP | 1024624 A2 | | 8/2000 | |
| EP | 1154596 A2 | | 11/2001 | |

* cited by examiner

*Primary Examiner*—Congvan Tran
(74) *Attorney, Agent, or Firm*—Philip Wadsworth; Kent D. Baker (57) ABSTRACT

A frequency-timing control loop comprising (1) a frequency control loop to acquire and track the frequency of a given signal instance in a received signal and (2) a timing control loop to acquire and track the timing of the same signal instance. The timing control loop processes data samples for the received signal to provide a first control indicative of timing error in the data samples for the signal instance. The frequency control loop includes (1) a frequency discriminator used to derive a second control indicative of frequency error in the data samples for the signal instance, and (2) a loop filter used to filter the first and second controls to provide a third control. This third control is used to adjust the frequency and phase of a periodic signal, which is used (directly or indirectly) to downconvert and digitize the received signal to provide the data samples.

37 Claims, 4 Drawing Sheets

FREQUENCY-TIMING CONTROL LOOP FOR WIRELESS COMMUNICATION SYSTEMS

BACKGROUND

1. Field

The present invention relates generally to data communication, and more specifically to a frequency-timing control loop for wireless (e.g., CDMA) communication systems.

2. Background

In a wireless communication system, an RF modulated signal transmitted from a source may reach a receiver at the destination, via a number of propagation paths (e.g., a line-of-sight path and/or reflected/scattered paths). In a multipath environment, the signal at a given receiver may thus include a number of instances of the transmitted signal. Each signal instance (or multipath component) may be associated with a different Doppler frequency shift due to movement of the receiver (or more precisely, due to relative motion between the receiver and the transmitter/reflector/scatterer associated with the signal instance). Each signal instance may further be associated with a different arrival time determined by the propagation path.

At the receiver, the received signal is conditioned and digitized to provide data samples. Conventionally, a rake receiver is used to process the data samples for multiple signal instances in the received signal. The rake receiver includes a number of finger processors, each of which may be assigned to process a respective signal instance based on the data samples. Each finger processor may include a rotator and an interpolator used to respectively provide frequency and time tracking for the assigned signal instance. In particular, the frequency error of the signal instance may be estimated with a frequency control loop and the rotator may then be used to remove this estimated frequency error from the data samples to provide frequency-translated data samples. Similarly, the timing error of the signal instance may be estimated with a timing control loop and the interpolator may then be used to re-sample the frequency-translated data samples at the optimal or near-optimal sample timing for the signal instance (i.e., the sample timing associated with the highest signal-to-interference-and-noise ratio (SINR) for the signal instance) to provide on-time samples. The on-time samples within each finger processor would then have the frequency and timing errors associated with the assigned signal instance removed.

The use of separate frequency and timing control loops to individually track the frequency and timing of a given signal instance provides good performance when the SINR of the received signal is low (such as for an IS-95 CDMA system). When such is the case, the SINR of the processed data samples (i.e., after rotation and interpolation) is not quite as sensitive to the rotation and interpolation of the data samples to remove the frequency and timing errors. However, for a system designed to operate at high SINRs (such as for an IS-856 CDMA system), the rotation and/or interpolation may result in noticeable degradation in the SINR of the processed data samples, which may then degrade performance.

There is therefore a need in the art for techniques to acquire and track the frequency and timing of a given signal instance, that are optimized for high SINR operating environments.

SUMMARY

Techniques are provided herein to acquire and track both the frequency and timing of a given signal instance such that re-sampling is not needed for the signal instance. This may then provide improved performance, especially at high SINR operating environments.

In an aspect, a frequency-timing control loop comprising a frequency control loop and a timing control loop is provided. The frequency control loop is used to acquire and track the frequency of a given signal instance (e.g., the strongest signal instance) in the received signal. The timing control loop is used to acquire and track the timing of the same signal instance and to adjust the phase of the ADC sampling clock so that the clock ticks are approximately aligned to the "optimum" sampling instants for the signal instance.

In a specific embodiment, the timing control loop includes a timing discriminator, a first loop filter, and a transfer gain element. The timing discriminator (which may be implemented as an early-late detector) processes data samples for the received signal to provide a timing error metric. The first loop filter then filters the timing error metric (e.g., based on a second-order loop filter). In an embodiment, the transfer gain element applies a non-linear function to the first loop filter output to provide a first control (a phase adjustment term) indicative of the timing error in the data samples for this given signal instance.

In a specific embodiment, the frequency control loop includes a frequency discriminator and a second loop filter. The frequency discriminator derives a second control (a frequency error metric) indicative of the frequency error in the data samples for the signal instance. The second loop filter then filters both the first and second controls (e.g., based on a first-order loop filter) to provide a third control. This third control may be used to adjust (1) the frequency of a local oscillator (LO) signal used to downconvert the received signal from RF to baseband, and (2) the phase of a clock signal used to digitize the downconverted signal to provide the data samples. In a typical implementation, the clock signal is derived by dividing down the LO signal, in which case alternatives (1) and (2) are equivalent.

Various aspects and embodiments of the invention are described in further detail below. The invention further provides control loops, methods, program codes, digital signal processors (DSPs), receiver units, terminals, base stations, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
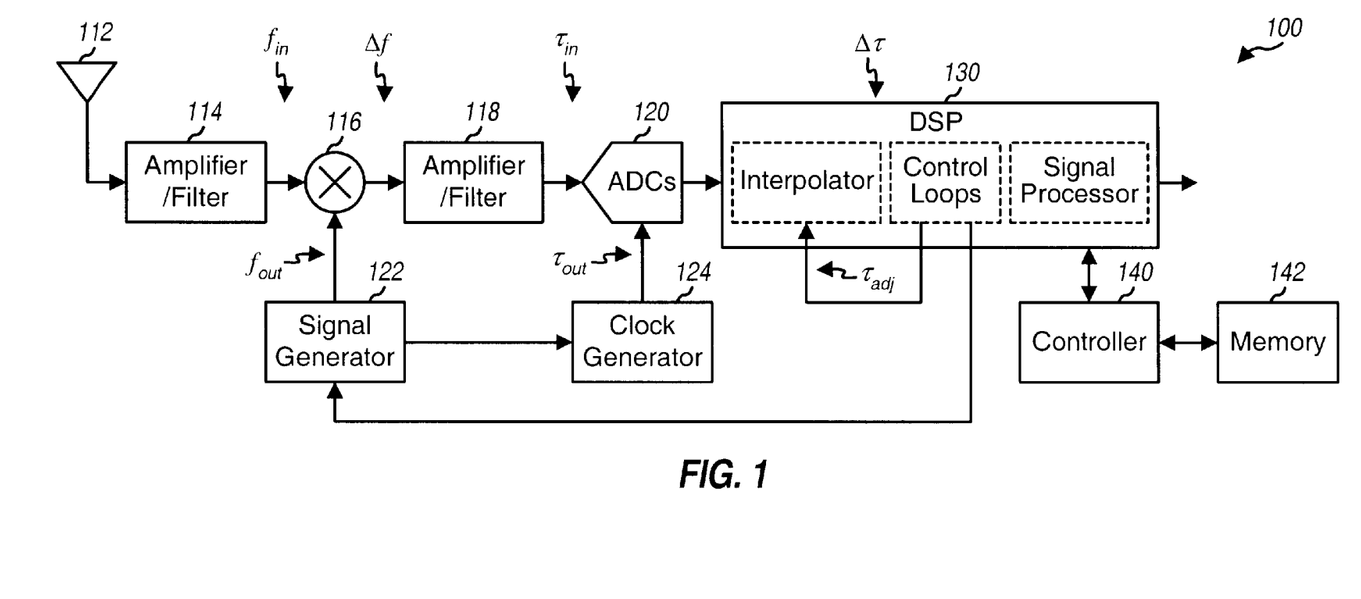
FIG. 1 is a block diagram of an embodiment of a receiver unit capable of implementing various aspects and embodiments of the invention.

FIG. 1 is a block diagram of an embodiment of a receiver unit 100 capable of implementing various aspects and embodiments of the invention. Receiver unit 100 may be implemented within a terminal (e.g., a cellular phone) or a base station. A terminal may also be referred to as a mobile station, a remote terminal, an access terminal, or some other terminology, and a base station may also be referred to as an access point, UTRAN, or some other terminology. Receiver unit 100 may also be used in various wireless communication systems such as, for example, IS-95, cdma2000, IS-856, W-CDMA, TS-CDMA, and GPS systems.

In FIG. 1, one or more RF modulated signals transmitted from one or more transmitters (e.g., base stations, GPS satellites, broadcast stations, and so on) are received by an antenna 112 and provided to a front-end unit or front-end circuitry. In this embodiment, the front-end unit comprises amplifiers/filters 114 and 118, a downconverter 116, and analog-to-digital converters (ADCs) 120. Amplifier/filter 114 amplifies the received signal with one or more low noise amplifier (LNA) stages and further filters the amplified RF signal to remove noise and spurious signals. Downconverter 116 then performs quadrature downconversion of the filtered RF signal from RF down to baseband (e.g., based on a heterodyne or a direct downconversion receiver design). The downconversion may be achieved by multiplying (or mixing) the filtered RF signal with a complex local oscillator (LO) signal to provide a complex baseband signal comprised of an inphase (I) component and a quadrature (Q) component.

Amplifier/filter 118 then amplifies the I and Q baseband components to obtain the proper signal amplitude for quantization and further filters the amplified components to remove spurious signals and out-of-band noise. ADCs 120 then digitize the filtered I and Q components to provide I and Q samples, respectively. In a specific embodiment, ADCs 120 provide I and Q samples at 2 times the chip rate (i.e., chip×2), with the chip rate being 1.2288 Mcps for some CDMA systems. The pair of I and Q samples for each chip×2 sample period is referred to herein as an ADC sample or a data sample. The data samples are provided to a digital signal processor (DSP) 130 for processing and/or may be stored to a sample buffer (not shown in FIG. 1).

DSP 130 may perform a number of functions such as filtering, rotation, re-sampling, demodulation, decoding, and so on. DSP 130 may also implement various control loops used to provide the proper sample timing and frequency control for each signal instance being processed, as described below. DSP 130 may also implement a rake receiver that can concurrently process multiple signal instances in the received signal.

A signal generator 122 provides the LO signal used by downconverter 116 and a reference signal (e.g., a chip×16 signal) to chip-clock generator 124. Signal generator 122 may include a frequency-accurate signal source (e.g., a voltage-controlled, temperature-compensated crystal oscillator (VC-TCXO)), frequency dividers, and integral/fractional-N phase lock loops (PLLs) (for frequency synthesis). Chip-clock generator 124 may divide down and/or buffer the reference signal to provide the sampling clocks for ADCs 120.

Controller 140 directs various operations of receiver unit 100 and may provide various controls for DSP 130 and signal generator 122. For example, controller 140 may provide a first set of controls to direct DSP 130 to acquire the frequency and timing for one or more signal instances, a second set of controls to direct signal generator 122 to move to another carrier frequency, and so on. A memory 142 provides storage for data and program codes for controller 140 and DSP 130.

In a typical RF receiver design, the conditioning of the received signal may be performed by one or more stages of amplifier, filter, mixer, and so on. In addition, these stages may be arranged in various configurations. For simplicity, the various signal conditioning stages are lumped together into the blocks shown in FIG. 1. Other RF receiver designs may also be used and are within the scope of the invention.

As noted above, in a multipath environment, each transmitted signal may be received via multiple propagation paths, and the received signal may thus include multiple instances of each transmitted signal. The received signal at the receiver unit may thus include multiple signal instances of one or more transmitted signals. Each signal instance is associated with a respective amplitude, frequency, and arrival time at the receiver unit.

Figure 2:
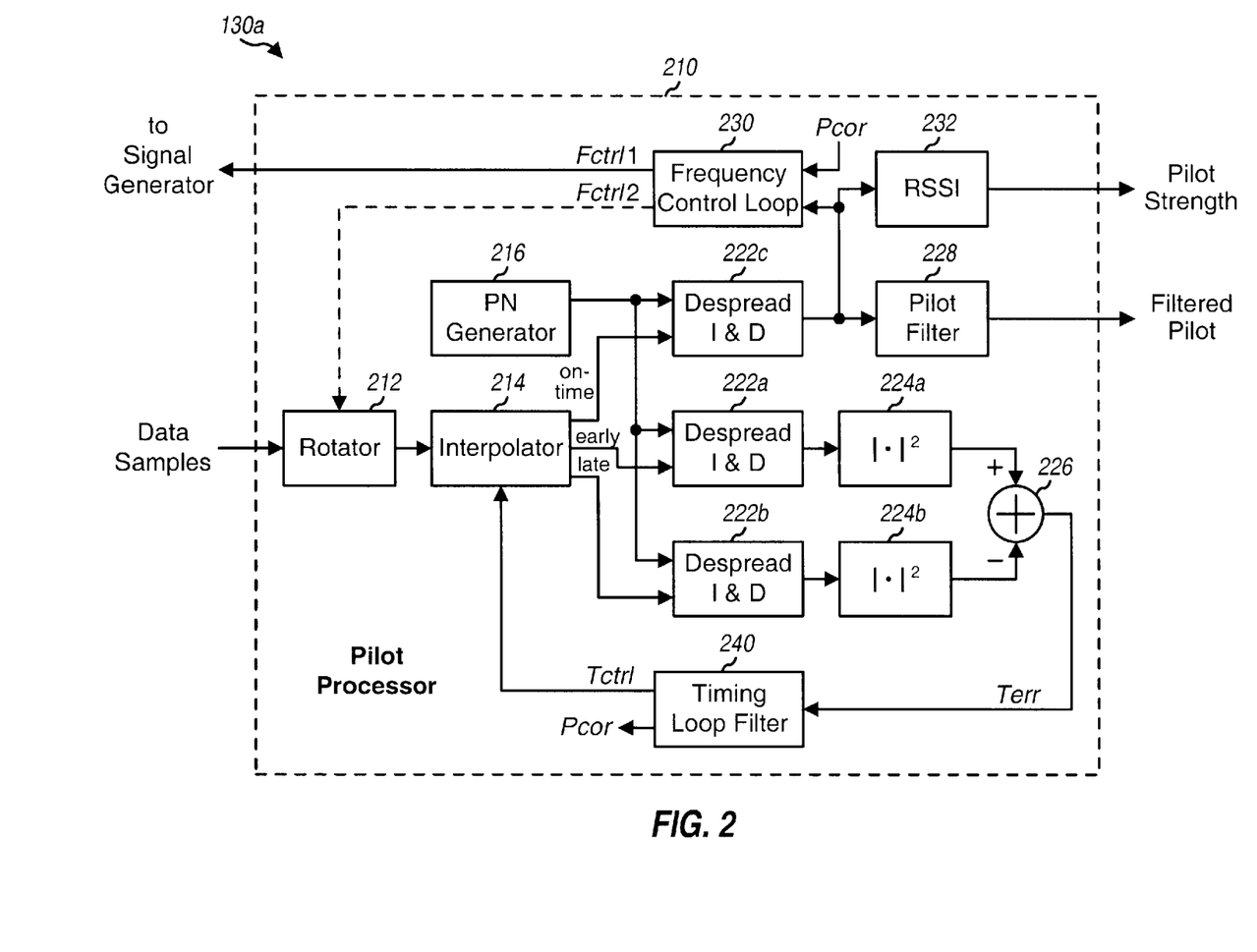
FIG. 2 is a block diagram of an embodiment of a DSP that may be used to acquire the frequency and timing of a given signal instance using a frequency-timing control loop.

FIG. 2 is a block diagram of an embodiment of a DSP 130a that may be used to acquire the frequency and timing of a given signal instance using the techniques described herein. DSP 130a may implement a rake receiver capable of concurrently processing multiple signal instances. The rake receiver typically includes a searcher and multiple finger processors. The searcher is typically used to search for strong signal instances in the received signal. Each finger processor may then be assigned to process a specific signal instance, as determined by the searcher. Each finger processor may include a pilot processor 210 used to process the data samples to acquire the pilot for the assigned signal instance. Each finger processor typically further includes other elements used for data demodulation, which are not shown in FIG. 2 for simplicity.

FIG. 2 shows a specific embodiment of pilot processor 210 within DSP 130a. Within pilot processor 210, the data samples from ADCs 120 are provided to a rotator 212, which performs a complex multiply of the data samples with a complex sinusoidal signal to provide frequency-translated (or rotated) data samples. The frequency of the complex sinusoidal signal is determined by a frequency control, Fctrl2. Rotator 212 may be used to remove phase rotation in the data samples due to downconversion frequency error and/or Doppler frequency shift in the signal instance being processed. The frequency of the complex sinusoidal signal used by rotator 212 is an estimate of the frequency error of the assigned signal instance, as determined by a frequency control loop 230.

Referring back to FIG. 1, the baseband signal from amplifier/filter 118 is initially sampled at a suitable rate (e.g., chip×2), and then quantized to a finite number of amplitude levels. The combination of sampling and quantization is referred to as analog-to-digital (A-to-D) conversion, and is performed by ADCs 120. In general, the sample timing used by the ADCs may not be aligned with the optimal sample timing of a given signal instance. Hence, the output of the ADCs is subsequently subjected to (e.g., linear) interpolation and decimation. The net effect of the interpolation and decimation is to change the "apparent" sampling time of the original baseband signal. This process may be referred to as "re-sampling" or "virtual" sampling. The interpolation-based re-sampling should be distinguished from the "real" sampling, that is performed by the ADCs prior to quantization. The pre-quantization sampling at the ADCs will henceforth be referred to as "ADC-sampling." Typically, the re-sampling instants may be offset from the ADC-sampling instants by certain discrete amounts (e.g., multiples of chip×8 period).

A timing control loop is used to track the timing of the signal instance being processed. This timing control loop may be conceptually decomposed into an "inner" loop and an "outer" loop. The inner timing control loop attempts to adjust the re-sampling instants (i.e., the re-sampler timing) so as to match the true signal delay of the selected signal instance. The outer timing control loop attempts to change the ADC-sampling instants (i.e., the ADC-sample timing), so as to match the true signal delay, thereby eliminating the need for re-sampling, for that signal instance. Conventional designs use only the inner loop, which is described below.

An interpolator 214 may re-sample the frequency-translated data samples to provide interpolated samples for the signal instance being processed. The re-sampling is performed based on a re-sampler timing control, Tctrl, provided by a timing loop filter 240. This re-sampler timing control indicates the specific time offset, $t_{adj}$, to be used for re-sampling the frequency-translated data samples, and is typically provided with a particular time resolution (e.g., chip×8 or $T_c/8$ resolution). For each chip period, interpolator 214 provides an "early" interpolated sample to a despread and integrate and dump (I & D) element 222a, a "late" interpolated sample to a despread I & D element 222b, and an "on-time" interpolated sample to a despread I & D element 222c. The on-time interpolated samples are approximations of the data samples that would have been provided by ADCs 120 had the ADC-sampling clock been aligned to the "optimum" sample timing, which is the timing that would have produced the highest signal-to-interference-and-noise ratio (SINR) for the signal instance. The early and late interpolated samples are approximations of the data samples at $-T_c/2$ and $+T_c/2$, respectively, from the on-time sampling instants.

A PN generator 216 provides to each despread I & D element 222 a PN sequence having a specific PN state (or PN phase) corresponding to the arrival time of the signal instance being processed. This PN state may be determined by the searcher in its search for strong signal instances in the received signal and is then provided to PN generator 216. Each despread I & D element 222 despreads its received interpolated samples with the PN sequence to provide despread samples, and further decovers the despread samples with the channelization code used for the pilot. For many CDMA systems, the channelization code for the pilot is a sequence of zeros (e.g., Walsh code zero), in which case the decovering may be omitted. Each despread I & D element 222 further accumulates (i.e., integrates) despread samples for a particular time duration to provide a complex pilot symbol, $P_I+jP_Q$. For a continuous pilot structure such as the ones used in IS-95 and cdma2000, the accumulation time duration may be an integer multiple of the channelization code length (i.e., 64·N, where N can be any integer). And for a gated pilot structure such as the ones used in IS-856 and W-CDMA, the accumulation time duration may correspond to each pilot burst or a portion of the pilot burst. For IS-856, each pilot burst covers a 96-chip period for each 1024-chip half-slot.

The pilot symbols derived from the on-time interpolated samples are used by frequency control loop 230 to derive the frequency controls Fctrl1 for signal generator 122 and/or Fctrl2 for rotator 212. In particular, within frequency control loop 230, the pilot symbols from despread I & D element 222c are provided to a frequency discriminator and used to derive a frequency error metric, Ferr, which is an estimate of the instantaneous error in the frequency of the signal instance being processed. A loop filter then filters the frequency error metric to provide the frequency controls, Fctrl1 and/or Fctrl2, which is then provided to rotator 212. Frequency control loop 230 is described in further detail below.

The pilot symbols derived from the on-time interpolated samples are also provided to a pilot filter 228 and a receive signal strength indicator (RSSI) 232. Pilot filter 228 filters the pilot symbols based on a particular lowpass filter response to provide a filtered pilot, which may be used for data demodulation and other purposes. RSSI 232 processes the pilot symbols to provide an estimate of the signal strength of the pilot (which is also indicative of the pilot SINR since the total noise is known or can be ascertained). The pilot strength estimate is provided to controller 140 and may be used to select a particular signal instance for frequency and time tracking based on a frequency-timing control loop.

The pilot symbols derived from the early and late interpolated samples are used by the timing control loop to derive the re-sampler timing control, Tctrl, for interpolator 214. The timing control loop may implement a delay lock loop (DLL) or some other design. The pilot symbols from despread I & D elements 222a and 222b are provided to a timing discriminator (e.g., an early/late detector) and used to derive a timing error metric, Terr, which is an estimate of the instantaneous error in the re-sampler timing (relative to optimal sampler timing) for the signal instance being processed. Timing loop filter 240 then filters the timing error metric and further quantizes the loop filter output to provide the updated re-sampler timing control, Tctrl.

For the embodiment shown in FIG. 2, the timing discriminator includes magnitude squarers 224a and 224b and summer 226. Magnitude squarers 224a and 224b receive the pilot symbols from despread I & D elements 222a and 222b, respectively. Each magnitude squarer 224 computes the energy, $E_P$, of each pilot symbol as $E_P = P_I^2 + P_Q^2$. Magnitude squarer 224a then provides the early pilot energy, $E_{P,early}$, derived based on the early interpolated samples, and magnitude squarer 224b provides the late pilot energy, $E_{P,late}$, derived based on the late interpolated samples. A summer 226 then subtracts the late pilot energy from the early pilot energy and provides the difference (i.e., $E_{P,early} - E_{P,late}$) to timing loop filter 240. Other types of timing discriminator may also be used for the timing control loop, as is known in the art.

The output from the timing discriminator (which is the timing error metric, Terr, from summer 226) is then filtered by timing loop filter 240 to provide an output indicative of the fine-grain error, $t_{diff}$, between the ADC-sampling instants and the "optimum" sampling instants for this signal instance. Timing loop filter 240 then quantizes the fine-grain timing error, $t_{diff}$, to provide a coarse-grain time offset, $t_{adj}$, that is used for re-sampling the frequency-translated data samples. Timing loop filter 240 then provides to interpolator 214 the re-sampler timing control, Tctrl, indicative of this time offset, $t_{adj}$.

Referring back to FIG. 1, a given signal instance in the received signal having a carrier frequency of $f_{in}$ is down-converted with an LO signal having a frequency of $f_{out}$ (which is the "effective" downconversion frequency for a heterodyne receiver with multiple frequency downconversion stages). The resultant baseband signal for this signal instance would then have a residual frequency offset (or a frequency error) of $\Delta f$. Each signal instance may have a different Doppler frequency shift and may thus be associated with a different input frequency, $f_{in}$. Since the same LO frequency, $f_{out}$, is used for all signal instances, each signal instance may then have a different frequency error, $\Delta f$. The rotator within the finger processor is then used to remove the frequency error, $\Delta f$, of the assigned signal instance.

Each signal instance is also associated with a respective arrival time at the receiver unit. The optimum sampling instants for a given signal instance may be represented as $\tau_{in}$. The received signal is sampled at some particular ADC-sampling instants, represented as $\tau_{out}$, which may or may not be time-aligned with the optimum sampling instants for any given signal instance. The difference between the ADC-sampling instants and optimum sampling instants, $\tau_{diff}$, for a given signal instance is estimated by the timing control loop used for that signal instance, and the difference is quantized to provide a time offset, $\tau_{adj}$. The interpolator within the finger processor assigned to process the signal instance is then used to re-sample the data samples from the ADCs (or the frequency-translated data samples from the rotator) based on the time offset, $\tau_{adj}$, to provide estimates of the samples that would have been obtained at the optimum sampling instants. However, because of quantization of the timing difference, $\tau_{diff}$, the interpolated samples have a timing error of $\Delta \tau$.

In a conventional design, one frequency control loop may be used to lock the frequency of the LO signal to the frequency of one of the signal instances in the received signal (e.g., the strongest signal instance). The frequency error of each individual signal instance to be processed is then estimated and removed by a respective frequency control loop operating in conjunction with the rotator for the assigned finger processor. In addition, a delay lock loop (time-tracking loop) is used to derive and track the timing for each signal instance to be processed.

The conventional design (employing only the inner loop for time tracking) provides good performance when the SINR of the received signal is low, which is generally true for a CDMA system designed to concurrently transmit to multiple terminals. For a system designed to operate at high SINRs (e.g., greater than 0 dB), such as the IS-856 system, the re-sampling may result in noticeable degradation in the signal SINR, which may then degrade demodulation and decoding performance. The degradation may be exacerbated if the fine-grain timing difference, $t_{diff}$, between the ADC-sampling and optimum sampling instants is quantized to a coarse (e.g., chip×8) time resolution to obtain the time offset, $t_{adj}$, used for re-sampling. In fact, it can be shown that quantization of the re-sample timing is one of the main reasons for jitter in the sample timing, and the resulting performance degradation.

Techniques are provided herein to acquire and track both the frequency and timing of a given signal instance such that re-sampling is not needed for this selected signal instance. This may then provide improved performance, especially at higher SINR operating environments. In an aspect, a frequency-timing control loop comprising a frequency control loop and an outer timing control loop is provided. The frequency control loop is used to acquire and track the frequency of the selected signal instance (e.g., the strongest signal instance) in the received signal. The outer timing control loop is used to adjust the phase of the ADC-sampling clock so that it is aligned with the "optimum" sampling instants for the selected signal instance. In addition, each finger processor may run its own inner timing control loop and rotator, which determine the re-sampler timing and frequency shift for the signal instance associated with that finger processor.

Figure 3:
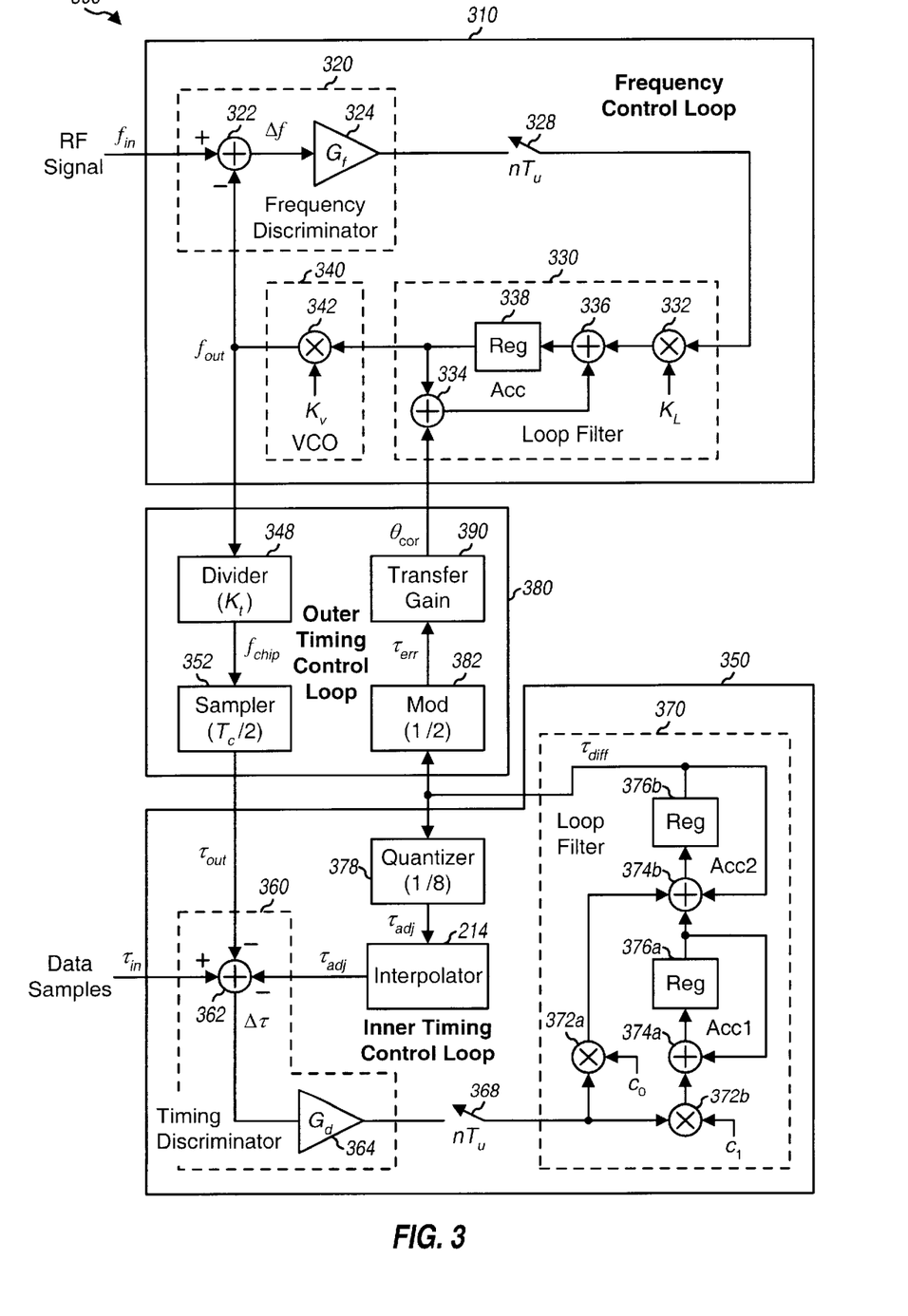
FIG. 3 is a diagram of a model for a frequency-timing control loop (i.e., a frequency control loop coupled with the outer/inner timing control loop) capable of acquiring and tracking both the frequency and timing of a given signal instance.

FIG. 3 is a diagram of a model for a frequency-timing control loop 300, which is capable of acquiring and tracking both the frequency and timing of a given signal instance. Frequency-timing control loop 300 couples a frequency control loop 310 with an inner time tracking loop 350, by means of an outer time tracking loop 380.

Frequency control loop 310 includes a frequency discriminator 320, a loop filter 330, and a VCO 340. Within frequency discriminator 320, the carrier frequency, $f_{in}$, of the signal instance is subtracted by the LO frequency, $f_{out}$, by a summer 322. The difference in frequency (i.e., the frequency error, $\Delta f$) is scaled with a gain of $G_f$ by a scaler 324. Summer 322 models downconverter 116 in FIG. 1 and scaler 324 provides the gain of the frequency discriminator. Frequency discriminator 320 provides an output that is approximately proportional to the instantaneous frequency error, $\Delta f$. A switch 328 models the sampling of the frequency discriminator output (e.g., for a gated pilot whereby the frequency discriminator output is only valid for each pilot burst).

Loop filter 330 receives and filters the frequency discriminator output. In an embodiment, loop filter 330 is implemented as a first-order loop and includes one loop accumulator comprised of a register 338 and a summer 336. The frequency discriminator output is initially scaled by a gain of $K_L$ by a multiplier 332 and the scaled value is further accumulated by the loop accumulator. A summer 334 combines the accumulator output with a phase correction term, $\theta_{cor}$, derived from the outer timing control loop, and the output from summer 334 is provided for accumulation with the scaled value from multiplier 332. The gain $K_L$ may be used to adjust the tracking bandwidth of the frequency control loop.

VCO 340 includes a multiplier 342 that receives and scales the output from loop filter 330 with a gain of $K_v$ to provide the LO frequency, $f_{out}$. The gain $K_v$ represents the transfer gain (e.g., output frequency versus input voltage) for the actual VCO used within signal generator 122 to generate the LO signal for the downconversion of the received signal from RF down to baseband.

In the embodiment shown in FIG. 3, outer timing control loop 380 includes a frequency divider 348, a ADC-sampler 352, a modulo (Mod) element 382, and a transfer gain element 390. For a CDMA system in which the carrier frequency is selected to be an integer multiple of the chip rate, frequency divider 348 may be used to divide the LO signal by a ratio of $K_t$, where $K_t=f_{chip}/f_{carrier}$, to obtain a chip-rate clock having a frequency of $f_{chip}$.

ADC-sampler 352 derives a chip×2 clock based on the chip-rate clock, and the chip×2 clock is used as the sampling clock for the ADCs. This sampling clock is associated with a receiver time reference, $t_{out}$, which may be scaled with the chip period, $T_c$, to obtain a normalized time reference, $\tau_{out}$. ADCs 120 sample the baseband signal with the sampling clock to provide data samples at the receiver time reference, tout. Since the sampling clock is twice the chip rate, the baseband signal may be assumed to be sampled whenever tout is an integer multiple of $T_c/2$, or equivalently, whenever $\tau_{out}$ is an integer multiple of ½.

Each signal instance in the received signal has a particular arrival time at the receiver unit and is further associated with a sequence of optimal sampling instants, one per chip period, that provides the highest SINR to the demodulator. Thus, each signal instance is associated with an optimal time reference $f_{chip}$, or a normalized optimal time reference $\tau_{in}=\tau t_{in}/T_c$, such that the optimal sampling instants correspond to those time instants when $t_{in}$ is an integral multiple of $T_c$, or equivalently, when $\tau_{in}$ is an integer.

Each finger processor of the rake receiver maintains an inner timing control loop that estimates the timing difference, $\tau_{diff}$, between the normalized receiver time reference, $\tau_{out}$, and the normalized optimal sampling time reference, $\tau_{in}$, for the signal instance being processed by the finger processor. The normalized receiver time reference, $\tau_{out}$, may or may not correspond to the optimal sampling time reference, $\tau_{in}$, for a given signal instance. Thus, an interpolator is included in each finger processor and used to re-sample the output of the ADC to derive interpolated samples that are estimates of the data samples that would have been obtained at the optimal sampling instants. For a linear interpolator, pairs of ADC samples obtained at time instants $\tau_{out}=n(T_c/2)$ are used for interpolation to obtain interpolated samples that are estimates of the data samples at the optimum time instants $\tau_{in}=n(T_c)$. The interpolator is designed with a particular time resolution, which may be an eighth of a chip period, or $T_c/8$. In this case, the timing difference, $\tau_{diff}$, is quantized to chip×8 resolution to provide the time offset, $\tau_{adj}$, used to determine the weights for the interpolation.

As shown in FIG. 3, inner timing control loop 350 includes a timing discriminator 360, a loop filter 370, and other elements that collectively implement the inner timing control loop. Within timing discriminator 360, the optimal sampling time reference, $\tau_{in}$, of the signal instance is subtracted by both the receiver time reference, $\tau_{out}$, and the time offset, $\tau_{adj}$, by a summer 362 to provide the instantaneous timing error, $\Delta\tau$. This timing error, $\Delta\tau$, is scaled by a gain of $G_d$ by a scaler 364. Summer 362 models the timing error from both the ADC sampling clock and the quantization of the timing difference, $\tau_{diff}$, and scaler 364 models the gain of the timing discriminator. Timing discriminator 360 provides an output that is approximately proportional to the instantaneous timing error, $\Delta\tau$. A switch 368 models the sampling of the timing discriminator output.

Loop filter 370 receives and filters the timing discriminator output. In an embodiment, loop filter 370 is implemented as a second-order loop and includes two loop accumulators. The first accumulator comprises a register 376a and a summer 374a, and the second accumulator comprises a register 376b and a summer 374b. The timing discriminator output is initially scaled by gains of $c_0$ and $c_1$ by multiplier 372a and 372b, respectively. The gains $c_0$ and $c_1$ may be used to adjust the tracking bandwidth of the timing control loop. The scaled value from multiplier 372b is accumulated by the first loop accumulator. The scaled value from multiplier 372a and the output from the first accumulator are then accumulated by the second loop accumulator. Loop filter 370 provides a loop output that is indicative of the timing difference, $\tau_{diff}$.

For the inner timing control loop, the output from loop filter 320 is used to adjust the re-sampling time for the signal instance. A quantizer 378 quantizes the timing difference, $\tau_{diff}$, to chip×8 resolution to provide the time offset, $\tau_{adj}$, which is then used by interpolator 214 to perform the interpolation.

The inner timing control loop is a coarse loop because of (1) the quantization of the timing difference, $\tau_{diff}$, to chip×8 resolution (which effectively results in the quantization of the optimal sampling instants to the same chip×8 resolution) and (2) the use of interpolation to derive estimates of the data samples at the optimal sampling instants. This coarse inner timing control loop provides good performance at low SINRs, but can result in some performance degradation at high SINRs.

The outer timing control loop may be used to minimize the performance loss at high SINRs by steering the receiver time reference, $\tau_{out}$, toward the optimal sampling time reference, $\tau_{in}$, for the given signal instance. This may be achieved by using the outer timing control loop to provide the proper sampler timing so that the received signal is directly sampled by the ADC at the optimal sampling instants, which would then obviate the need for re-sampling.

The receiver time reference may be synchronized with the optimal sampling time reference for a single signal instance if only one set of ADCs is used to sample the received signal. In an embodiment, the receiver time reference is steered toward the optimal sampling time reference for the strongest signal instance. Since the conventional design with separate frequency and timing control loops can provide good performance at low SINRs, the outer timing control loop may be enabled only if the SINR of the strongest signal instance exceeds a particular threshold (e.g., 4.5 dB).

In an embodiment, the frequency-timing control loop is implemented by extending the frequency control loop to incorporate the timing error estimates obtained by the outer timing control loop. The loop provides an estimate of the timing difference, $\tau_{diff}$, between the ADC-sampling and optimal time references. If the received signal is sampled at chip×2, then the ADC-sampling instants coincide with the optimal sampling instants if $$\tau_{out}=\tau_{in}(\text{modulo } \tfrac{1}{2})$$

or, equivalently, if $$\tau_{diff}=0(\text{modulo } \tfrac{1}{2})$$

A normalized timing error, $\tau_{err}$, may be defined as follows:

$$\tau_{err}=\tau_{diff} \bmod \tfrac{1}{2}$$

This timing error $\tau_{err}$ may be generated by Mod element 382 in outer timing control loop 380 in FIG. 3, and may be represented as a signed number between $-\tfrac{1}{4}$ and $+\tfrac{1}{4}$. The outer timing control loop uses the normalized timing error, $\tau_{err}$, to generate a phase adjustment term, $\theta_{cor}$, which is combined with the correction term from the frequency discriminator. These two terms are then filtered by loop filter 330 and used to update the frequency and phase of the LO signal.

The frequency control loop uses the frequency adjustment term from the frequency discriminator to lock the frequency of the LO signal to the carrier signal of a given signal instance in the received signal. Upon achieving frequency lock, the frequency control loop maintains an average LO frequency that is equal to the frequency of the incoming signal instance, but the phase offset between the signal instance and the LO signal may vary over time in an unbiased manner. In the absence of the phase adjustment term (conventional time tracking), the phase offset behaves like a Brownian motion. With the outer time tracking loop enabled, the phase adjustment term, $\theta_{cor}$, steers the residual phase offset between the signal instance and the LO signal in such a way that the ADC-sampler time reference, $\tau_{out}$, coincides with the optimal sampling time reference, $\tau_{in}$. As a result, this signal instance does not require interpolation, and hence improved SINR may be achieved for the signal instance.

As shown in FIG. 3, transfer gain element 390 within outer timing control loop 380 receives the normalized timing error, $\tau_{err}$, from the timing loop filter and provides the timing-based phase adjustment term, $\theta_{cor}$. In an embodiment, element 390 implements a non-linear transfer function, $\Psi(\tau_{err})$, such that several design goals are achieved, as described below.

The phase adjustment term, $\theta_{cor}$, induces a transient frequency offset between the LO signal and the signal instance as it drives the residual phase offset to the desired value. The outer timing control loop may be designed such that it does not induce too large a frequency error at any given time, especially when the outer timing control loop has just been turned on. This may be achieved by limiting (or saturating) the absolute value of the phase adjustment term, $\theta_{cor}$, to a particular maximum value if the magnitude of the timing error, $\tau_{err}$, is too large. This then avoids large frequency error, especially during the transient state, which may degrade demodulation performance. Conversely, if the timing error is too small and would have negligible impact on SINR, then the phase adjustment term, $\theta_{cor}$, may be set to zero. This then minimizes or reduces steady-state frequency jitter on the LO signal induced by the phase adjustment term.

In an embodiment, the phase adjustment term, $\theta_{cor}$, may be expressed as:

$$\theta_{cor} = K_v^{-1} \Psi(\tau_{err}). \qquad \text{Eq (1)}$$

In an embodiment, the transfer function, $\Psi(\tau_{err})$, for the timing error, $\tau_{err}$, is given by the following expression:

$$\Psi(\tau_{err}) = \begin{cases} 0 & \text{if } |\tau_{err}| \leq \tau_{min} \\ G_p \tau_{err} & \text{if } \tau_{min} < |\tau_{err}| \leq \tau_{max} \\ \text{sign}(\tau_{err}) \cdot G_p |\tau_{err}| & \text{if } \tau_{max} < |\tau_{err}|. \end{cases} \qquad \text{Eq (2)}$$

As shown in equation (2), when the magnitude of the timing error is neither too large nor too small, the function $\Psi(\tau_{err})$ is linear in the timing error, $\tau_{err}$. In a specific embodiment, the following values may be used for the parameters of equation (2): $\tau_{min} = 1/16$ and $G_p |\tau_{err}| = 20$. Other design values may also be used and are within the scope of the invention.

The performance of the frequency-timing control loop may be analyzed, and performance metrics such as tracking bandwidths and steady-state jitter may be determined in a manner known by one skilled in the art.

In many receiver implementations, the ADC sampling clock is tied to the LO frequency. Hence, changing ADC-sampler timing introduces transient frequency errors in the RF/IF downconversion mixers. Furthermore, a common local oscillator and a common sampler are shared by all finger processors of the rake receiver. Therefore, the outer timing control loop affects the sampling instants for all finger processors. Consequently, the outer loop may be activated on one particular finger processor (i.e., one path/signal instance), while the inner loop may activated/deactivated independently on each signal instance. In other words, the inner timing control loop may be operated independently for each finger processor. Since the outer timing control loop yields performance gains mainly at high SINR, this loop may be operated so that the ADC-sampler timing is optimized for the signal instance with the highest SINR.

While the inner timing control loop is nearly independent of the frequency control loop, the outer timing control loop is tightly coupled with the frequency control loop as well as with the other inner loops operated by the individual finger processors. It is necessary to avoid undesired interactions (positive-feedback) between these various control loops, which could lead to instability.

In an embodiment, stability may be ensured by enabling the outer timing control loop only when the SINR at one of the finger processors is reasonably high (as to justify performance gains). To also ensure loop stability, the tracking bandwidth, $f_{TR,out}$, of the frequency-timing control loop with respect to the phase adjustment term, $\theta_{cor}$, may be designed to be smaller than both (1) the tracking bandwidth, $f_{TR,f}$, of the frequency control loop, and (2) the tracking bandwidth, $f_{TR,in}$, of the inner timing control loop. Stability may be ensured if the tracking bandwidth $f_{TR,out}$ is a factor of two or more smaller than the tracking bandwidths $f_{TR,f}$ and $f_{TR,in}$. In a specific design, the tracking bandwidth $f_{TR,out}$ may be designed to be several orders of magnitude smaller than the tracking bandwidths $f_{TR,f}$ and $f_{TR,in}$.

For the forward link in an IS-856 system with a gated pilot transmission scheme, the frequency control loop may be designed to have a tracking bandwidth on the order of 100 Hz at high SINR, and a steady-state frequency jitter with a standard deviation of below 10 Hz.

The selection of a non-linear function, $\Psi(\ )$, for the transfer function between the timing error, $\tau_{err}$ and the phase adjustment term, $\theta_{cor}$, as shown in equation (2), is driven by the need to reduce frequency jitter given the need to balance conflicting design requirements. The dead-zone in the function $\Psi(\ )$ for small values of $\tau_{err}$ (i.e., $\Psi(\tau_{err})=0$, for $|\tau_{err}| \leq \tau_{min}$) ensures that $\gamma_p=0$ when the receiver time reference, $\tau_{out}$, is near-optimal. Saturation of the function $\Psi(\ )$ for large values of $\tau_{err}$ (i.e., $\Psi(\tau_{err}) = \text{sign}(\tau_{err}) \cdot G_p |\tau_{err}|$, for $\tau_{err} > \tau_{max}$) is intended to limit the peak value of the frequency error due to steady-state jitter of the timing loop filter output, and the large phase adjustment term $\theta_{cor}$, when the receiver time reference, $\tau_{out}$, is far away from the optimal time reference, $\tau_{in}$ (i.e., during the transient period of the outer timing loop operation).

The frequency-timing control loop may be implemented based on various designs. One specific design is described below.

Figure 4:
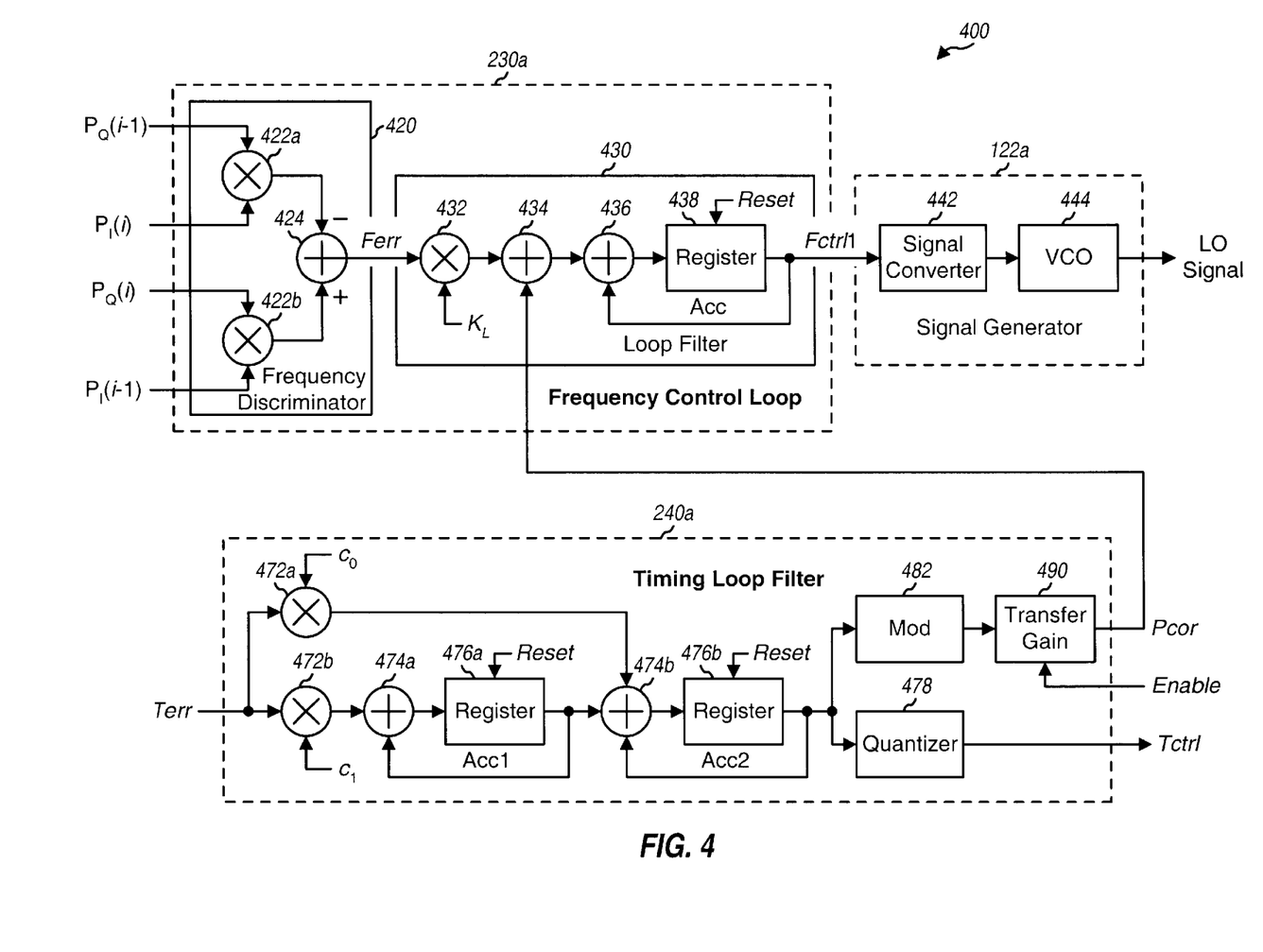
FIG. 4 is a block diagram of a specific design for a frequency-timing control loop.

FIG. 4 is a block diagram of a frequency-timing control loop 400 that may be used to acquire and track both the frequency and timing of a given signal instance. Frequency-timing control loop 400 includes a frequency control loop 230a and a timing loop filter 240a, which are one embodiment of frequency control loop 230 and timing loop filter 240, respectively, in FIG. 2.

Frequency control loop 230a includes a frequency discriminator 420 coupled to a loop filter 430. Frequency discriminator 420 receives a pair of consecutive complex pilot symbols, $P_1(i)+jP_Q(i)$ and $P_I(i-1)+jP_Q(i-1)$, from despread I & D elements 222c, which are derived based on the on-time interpolated samples. Frequency discriminator 420 then derives the frequency error metric, Ferr, for these pilot symbols. In particular, within frequency discriminator 420, a multiplier 422a receives and multiplies the imaginary part of the previous pilot symbol, PQ(i−1), with the real part of the current pilot symbol, $P_I(i)$, and provides the product to a summer 424. A multiplier 422b similarly receives and multiplies the real part of the previous pilot symbol, $P_I(i-1)$, with the imaginary part of the current pilot symbol, $P_Q(i)$, and also provides the product to summer 424. Summer 424 then subtracts the product of multiplier 422a from the product of multiplier 422b and provides the frequency error metric, Ferr. Other types of frequency discriminator may also be used, and this is within the scope of the invention.

In the embodiment shown in FIG. 4, loop filter 430 implements a first-order loop filter for the frequency control loop. Loop filter 430 includes a single accumulator comprised of a summer 436 and a register 438. The first loop filter input (which is the frequency error metric, Ferr, from frequency discriminator 420) is initially scaled with a scaling factor, $K_L$, by a multiplier 432. The scaled value from multiplier 432 is then combined with the second loop filter input (which is the phase correction term, Pcor or $\theta_{cor}$, from timing loop filter 240a) by a summer 434, and the combined value is accumulated by the loop accumulator. The output from the accumulator comprises the frequency control loop output, Fctrl1, which is provided to signal generator 122a. This loop output is an estimate of the frequency error, $\Delta f$, of the data samples.

Signal generator 122a is one embodiment of signal generator 122 in FIG. 1. Within signal generator 122a, a signal converter 442 receives and conditions the frequency control loop output, Fctrl1, to provide a control signal having a suitable form (e.g., a voltage or current). The control signal is then used to adjust the frequency and phase of a VCO 444. VCO 444 provides the LO signal to downconverter 116 and (although not shown in FIG. 4) may further provide to clock generator 124 a reference signal used to derive the sampling clock for ADCs 120. The reference signal may be a divided down version of the LO signal. VCO 444 may be implemented with various designs (e.g., as a single VCO, a VCO phase-locked to a VCXO, or based on some other design) as is known in the art.

In general, the frequency control loop output, Fctrl1, is used to adjust the frequency and phase of a "periodic" signal that directly or indirectly determines (1) the frequency of the LO signal used to downconvert the received signal and (2) the phase of the clock signal used to digitize the downconverted signal. This periodic signal may be the LO signal itself, or an intermediate signal to which the LO and clock signals may be locked to via one or more phase lock loops (PLLs), as is known in the art. The reference signal provided by the signal generator to the clock generator may be the ADC-sampling clock itself. Alternatively, the ADC-sampling clock may be derived based on the reference signal (e.g., by dividing down the reference signal or by locking another VCO to the reference signal).

In the embodiment shown in FIG. 4, timing loop filter 240a implements a second-order loop filter for the timing control loop. Timing loop filter 240a includes a first accumulator comprised of a summer 474a and a register 476a, and a second accumulator comprised of a summer 474b and a register 476b. The timing loop filter input (which is the timing error metric, Terr, from the timing discriminator shown in FIG. 2) is initially scaled with a scaling factor, co, by a multiplier 472a and also scaled with a scaling factor, $c_1$, by a multiplier 472b. The scaled value from multiplier 472b is then accumulated by the first accumulator. The output from the first accumulator is combined with the scaled value from multiplier 472a by summer 474b, and the combined value is further accumulated by the second accumulator.

For the inner timing control loop, a quantizer 478 quantizes the output from the second accumulator (which corresponds to the timing difference, $\tau_{diff}$, in the outer timing control loop model in FIG. 3) to a particular desired resolution (e.g., $T_c/8$), as required by the interpolator used to re-sample the data samples from the ADCs. Upon achieving both frequency and timing lock for a given signal instance with the outer timing control loop, the signal instance is sampled at the optimal (or near optimal) sampling time instants, and interpolation is not required for this signal instance. However, if the outer timing control loop is not enabled, or for a signal instance for which the outer timing control loop is not available, then quantizer 478 (within the inner timing control loop) provides the re-sampler timing control, Tctrl, used for interpolation. The output from quantizer 478 corresponds to the time offset, $\tau_{adj}$, in the frequency-timing control loop model in FIG. 3.

For the outer timing control loop, the output from the second accumulator is provided to a Mod element 482, which performs modulo-M operation, where $M=T_s/T_c$, $T_s$ is the sample period, and $T_c$ is the chip period. If the sample rate is chip×2, then $T_s=T_c/2$ and $M=\frac{1}{2}$. If M is a power of twos, then the modulo-M operation may be performed by omitting some of the more significant bits (MSBs) from the second accumulator and passing the remaining less significant bits (LSBs). The output from Mod element 482 corresponds to the timing error, $\tau_{err}$, in the frequency-timing control loop model in FIG. 3).

A transfer gain element 490 receives the timing error from Mod element 482 and provides the phase correction term, Pcor, based on a particular transfer function, e.g., the one shown in equation (1). In an embodiment, this transfer function includes a non-linear function such as the one shown in equation (2). Transfer gain element 490 also receives an Enable signal, which indicates whether or not the outer timing control loop is enabled. Transfer gain element 490 provides valid phase correction term, Pcor, if the outer timing control loop is enabled (e.g., the Enable signal is at logic high) or zero otherwise.

FIG. 4 shows a specific design for each of the components of the frequency-timing control loop. Other designs that may be used for the frequency discriminator and loop filters are described in numerous references available in the art. One such reference is a book by A. J. Viterbi, entitled "Principles of Spread Spectrum Multiple Access Communications," $2^{nd}$ Ed., McGraw Hill, 1977, which is incorporated herein by reference.

As noted above, DSP 130 may implement a rake receiver that includes a number of finger processors, each of which may include a frequency control loop and a timing control loop to respectively acquire and track the frequency and timing for the signal instance assigned to the finger processor. Since downconversion and A-to-D conversion (ADC) is common to all multipath-instances in the received signal, the frequency of the LO signal used for the downconversion and the phase of the clock signals used for the ADC-sampling may be adjusted for only one signal instance in the received signal. This signal instance may be selected as the strongest signal instance that exceeds a particular threshold (e.g., 4.5 dB).

The outer timing control loop may thus be enabled for one signal instance. For this signal instance, rotation and interpolation of the data samples are not needed since its frequency and timing are adjusted based on the LO signal and the ADC-sampling clock, respectively. For each of the other signal instances that may be concurrently processed along with this signal instance, rotator 212 may be used to correct for the signal instance's residual frequency error and interpolator 214 may be used to correct for the signal instance's residual timing error.

The techniques described herein may be implemented by various means. For example, the frequency-timing control loop may be implemented in hardware, software, or a combination thereof. For a hardware implementation, the elements of the frequency-timing control loop may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, all or portions of the frequency-timing control loop may be implemented with modules (e.g., procedures, functions, and so on) that perform the functions described herein. The software codes may be stored in a memory unit (e.g., memory 142 in FIG. 1) and executed by a processor (e.g., DSP 130 or controller 140). The memory unit may be implemented within the processor or external to the processor, in which case it can be communicatively coupled to the processor via various means as is known in the art.

The frequency-timing control loop may also be implemented with a combination of hardware and software. For example, hardware may be used to derive the pilot symbols, and software may be used to implement the frequency discriminator, frequency loop filter, and timing loop filter.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A frequency-timing control loop comprising:
   a timing control loop operative to process data samples for a received signal to derive a first control indicative of timing error in the data samples for a particular signal instance in the received signal; and
   a frequency control loop coupled to the timing control loop and including
      a frequency discriminator operative to derive a second control indicative of frequency error in the data samples for the signal instance, and
      a first loop filter operative to filter the first and second controls to provide a third control for adjusting frequency and phase of a periodic signal used to process the received signal to provide the data samples.

2. The frequency-timing control loop of claim 1, wherein the third control is used to adjust the frequency of a local oscillator (LO) signal used to downconvert the received signal from RF to baseband.

3. The frequency-timing control loop of claim 2, wherein the third control is further used to adjust the phase of a clock signal used to digitize the downconverted signal to provide the data samples.

4. The frequency-timing control loop of claim 3, wherein the clock signal is derived by dividing the LO signal.

5. The frequency-timing control loop of claim 3, wherein the phase of the clock signal is adjusted to maximize signal-to-interference-and-noise ratio (SINR) of the data samples for the signal instance.

6. The frequency-timing control loop of claim 1, wherein the first control from the timing control loop is enabled if the signal instance has a signal strength exceeding a particular threshold.

7. The frequency-timing control loop of claim 1, wherein the first control from the timing control loop is derived based on a non-linear function.

8. The frequency-timing control loop of claim 7, wherein the first control is set to zero if the timing error is less than a first threshold.

9. The frequency-timing control loop of claim 7, wherein the first control is set to a particular maximum value if the timing error exceeds a second threshold.

10. The frequency-timing control loop of claim 7, wherein the first control is set to zero if the timing error is less than a first threshold and to a particular maximum value if the timing error exceeds a second threshold, and is linearly related to the timing error if the timing error is between the first and second thresholds.

11. The frequency-timing control loop of claim 1, wherein the timing control loop includes
    a timing discriminator operative to process the data samples to provide a timing error metric, and
    a second loop filter operative to filter the timing error metric.

12. The frequency-timing control loop of claim 11, wherein the timing discriminator is implemented as an early-late detector.

13. The frequency-timing control loop of claim 11, wherein the timing control loop further includes
    a transfer gain element operative to apply a non-linear function to an output of the second loop filter to provide the first control.

14. The frequency-timing control loop of claim 11, wherein the second loop filter is implemented as a second-order loop filter.

15. The frequency-timing control loop of claim 1, wherein the first loop filter is implemented as a first-order loop filter.

16. The frequency-timing control loop of claim 1, wherein a tracking bandwidth for the first control is at least a factor of two smaller than a tracking bandwidth for the second control.

17. A frequency-timing control loop comprising:
    a timing control loop including
       a timing discriminator operative to process data samples for a received signal to provide a timing error metric,
       a first loop filter operative to filter the timing error metric, and
       a transfer gain element operative to apply a non-linear function to an output of the first loop filter to provide a first control indicative of timing error in the data samples for a particular signal instance in the received signal; and
    a frequency control loop coupled to the timing control loop and including
       a frequency discriminator operative to derive a second control indicative of frequency error in the data samples for the signal instance, and
       a second loop filter operative to filter the first and second controls to provide a third control for adjusting frequency and phase of a periodic signal used to process the received signal to provide the data samples.

18. In a wireless communication system, a method of acquiring and tracking frequency and timing of a signal instance in a received signal, comprising:
    first processing data samples for the received signal to provide a first control indicative of timing error in the data samples for the signal instance;
    second processing the data samples to provide a second control indicative of frequency error in the data samples for the signal instance; and
    filtering the first and second controls to provide a third control for adjusting frequency and phase of a periodic signal used to process the received signal to provide the data samples.

19. The method of claim 18, wherein the second processing includes
  processing the data samples with a frequency discriminator to provide the second control.
20. The method of claim 18, wherein the first processing includes
  processing the data samples with a timing discriminator to provide a timing error metric, and
  filtering the timing error metric with a first loop filter.
21. The method of claim 20, wherein the first processing further includes
  applying a non-linear function to an output of the first loop filter to provide the first control.
22. The method of claim 18, further comprising:
  estimating a signal strength of the signal instance; and
  enabling the first control if the estimated signal strength exceeds a particular threshold.
23. The method of claim 18, wherein a plurality of signal instances in the received signal are concurrently processed, and wherein the frequency and phase of the periodic signal are adjusted to achieve frequency and timing lock for a single selected signal instance.
24. The method of claim 23, wherein the selected signal instance has a highest signal strength among the plurality of signal instances.
25. The method of claim 18, further comprising:
  adjusting the frequency of a local oscillator (LO) signal based on the third control, wherein the LO signal is used to downconvert the received signal from RF to baseband.
26. The method of claim 25, further comprising:
  adjusting the phase of a clock signal based on the third control, wherein the clock signal is used to digitize the downconverted signal to provide the data samples.
27. The method of claim 26, further comprising:
  dividing the LO signal to provide the clock signal.
28. A frequency-timing control loop comprising:
  means for deriving a first control indicative of timing error in data samples for a particular signal instance in a received signal;
  means for deriving a second control indicative of frequency error in the data samples for the signal instance; and
  means for filtering the first and second controls to provide a third control for adjusting frequency and phase of a periodic signal used to process the received signal to provide the data samples.
29. An integrated circuit comprising:
  a timing control loop operative to process data samples for a received signal to derive a first control indicative of timing error in the data samples for a particular signal instance in the received signal; and
  a frequency control loop coupled to the timing control loop and including
    a frequency discriminator operative to derive a second control indicative of frequency error in the data samples for the signal instance, and
    a first loop filter operative to filter the first and second controls to provide a third control for adjusting frequency and phase of a periodic signal used to process the received signal to provide the data samples.
30. The integrated circuit of claim 29, further comprising:
  a detector operative to estimate a signal strength of the signal instance, and wherein the first control is enabled if the estimated signal strength exceeds a particular threshold.

31. A receiver unit in a wireless communication system, comprising:
  a front-end unit operative to process a received signal to provide data samples; and
  a digital signal processor including a frequency-timing control loop operative to derive a first control indicative of timing error in the data samples for a particular signal instance in the received signal, derive a second control indicative of frequency error in the data samples for the signal instance, and filter the first and second controls to provide a third control for adjusting frequency and phase of a periodic signal used to process the received signal to provide the data samples.
32. The receiver unit of claim 31, further comprising:
  a signal generator operative to adjust the frequency of a local oscillator (LO) signal based on the third control, wherein the LO signal is used by the front-end unit to downconvert the received signal from RF to baseband.
33. The receiver unit of claim 32, wherein the signal generator is further operative to adjust the phase of a reference signal based on the third control, wherein the reference signal is used to derive a clock signal used by the front-end unit to digitize the downconverted signal to provide the data samples.
34. A terminal comprising the receiver unit of claim 31.
35. A base station comprising the receiver unit of claim 31.
36. A receiver apparatus in a wireless communication system, comprising:
  means for downconverting a received signal with a local oscillator (LO) signal to provide a downconverted signal;
  means for digitizing the downconverted signal with a clock signal to provide data samples;
  means for deriving a first control indicative of timing error in the data samples for a particular signal instance in the received signal;
  means for deriving a second control indicative of frequency error in the data samples for the signal instance;
  means for filtering the first and second controls to provide a third control;
  means for adjusting a frequency of the LO signal based on the third control; and
  means for adjusting a phase of the clock signal based on the third control.
37. A terminal comprising
  a signal generator operative to provide a local oscillator (LO) signal and a reference signal;
  a clock generator operative to provide a clock signal based on the reference signal;
  a front-end unit operative to downconvert a received signal based on the LO signal and to digitize the downconverted signal based on the clock signal to provide data samples; and
  a digital signal processor including a frequency-timing control loop operative to derive a first control indicative of timing error in the data samples for a particular signal instance in the received signal, derive a second control indicative of frequency error in the data samples for the signal instance, and filter the first and second controls to provide a third control, wherein the frequency of the LO signal and the phase of the clock signal are both adjusted based on the third control.

* * * * *